United States Patent [19]

Knipper

[11] 4,047,245
[45] Sept. 6, 1977

[54] INDIRECT MEMORY ADDRESSING

[75] Inventor: Gary L. Knipper, Bolingbrook, Ill.

[73] Assignee: Western Electric Company, Incorporated, New York, N.Y.

[21] Appl. No.: 704,594

[22] Filed: July 12, 1976

[51] Int. Cl.² ............................................. G06F 13/00
[52] U.S. Cl. ................................... 364/200; 364/900
[58] Field of Search ..................... 340/172.5; 364/900, 364/200

[56] References Cited

U.S. PATENT DOCUMENTS

| | | | |
|---|---|---|---|
| 3,359,544 | 12/1967 | Macon | 340/172.5 |
| 3,378,819 | 4/1968 | Hannicq | 340/172.5 |
| 3,380,025 | 4/1968 | Ragland | 340/172.5 |
| 3,391,394 | 7/1968 | Ottaway | 340/172.5 |
| 3,614,741 | 10/1971 | McFarland, Jr. | 340/172.5 |
| 3,967,104 | 6/1976 | Brantingham | 340/172.5 |

*Primary Examiner*—James D. Thomas
*Attorney, Agent, or Firm*—R. P. Miller

[57] ABSTRACT

In order to provide indirect memory addressing for a stored-program digital processor which is not normally equipped with facilities for indirect memory addressing, a multiplexer (electronic gang switch) is interposed between the memory address output register of a central processing unit (CPU) and the address input of the memory. Several memory locations are dedicated to the indirect addressing function. When one of these dedicated locations is addressed, a decoder stops the CPU while the memory fetches the contents of the addressed, dedicated memory location. This dedicated memory location contains the address of the desired data. This actual address of the desired data is read from memory and stored in a register. The multiplexer directs the output of the register to the address input of the memory. The memory then addresses the actual location of the desired data, and the CPU reads the desired data from the memory.

3 Claims, 4 Drawing Figures

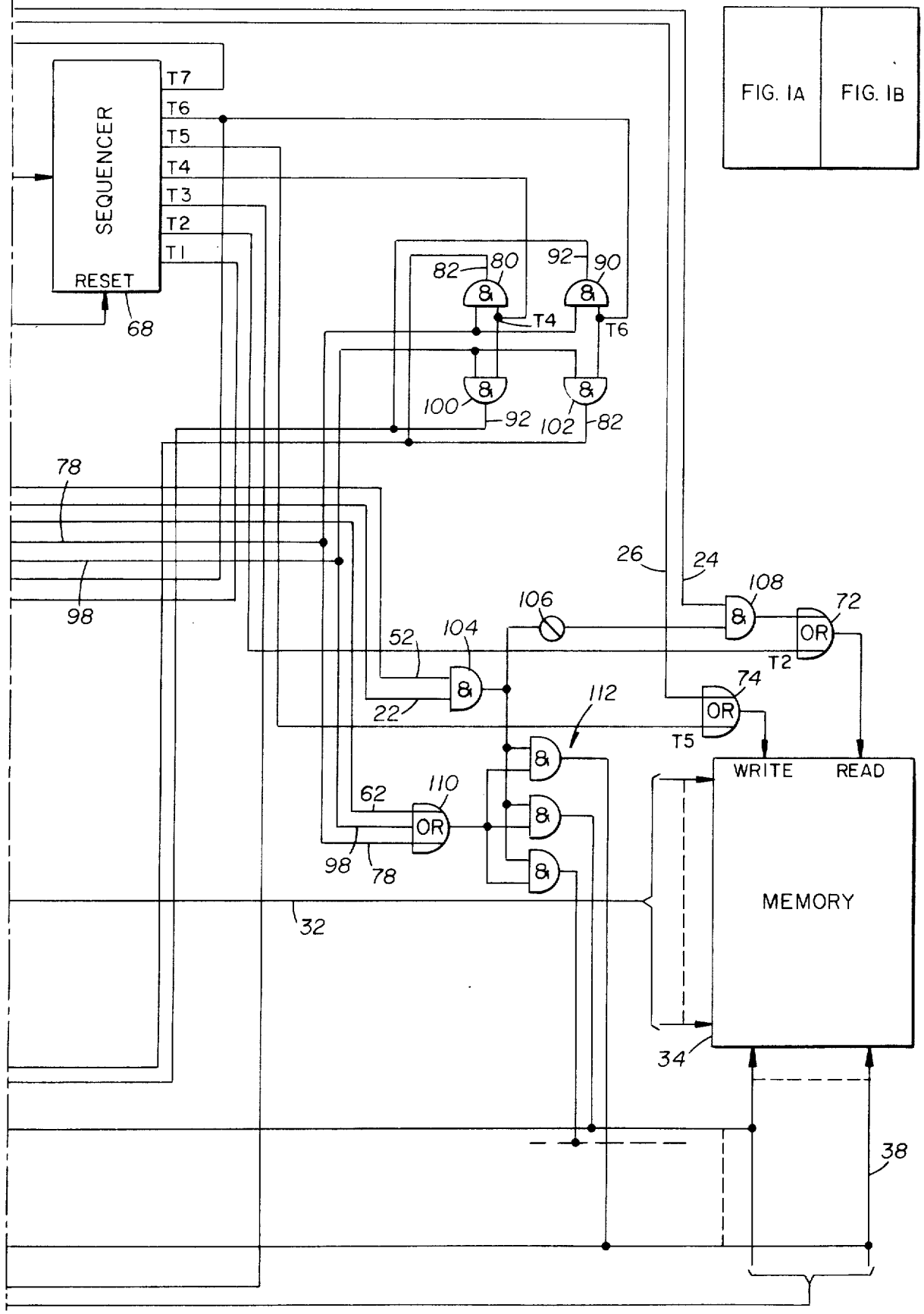

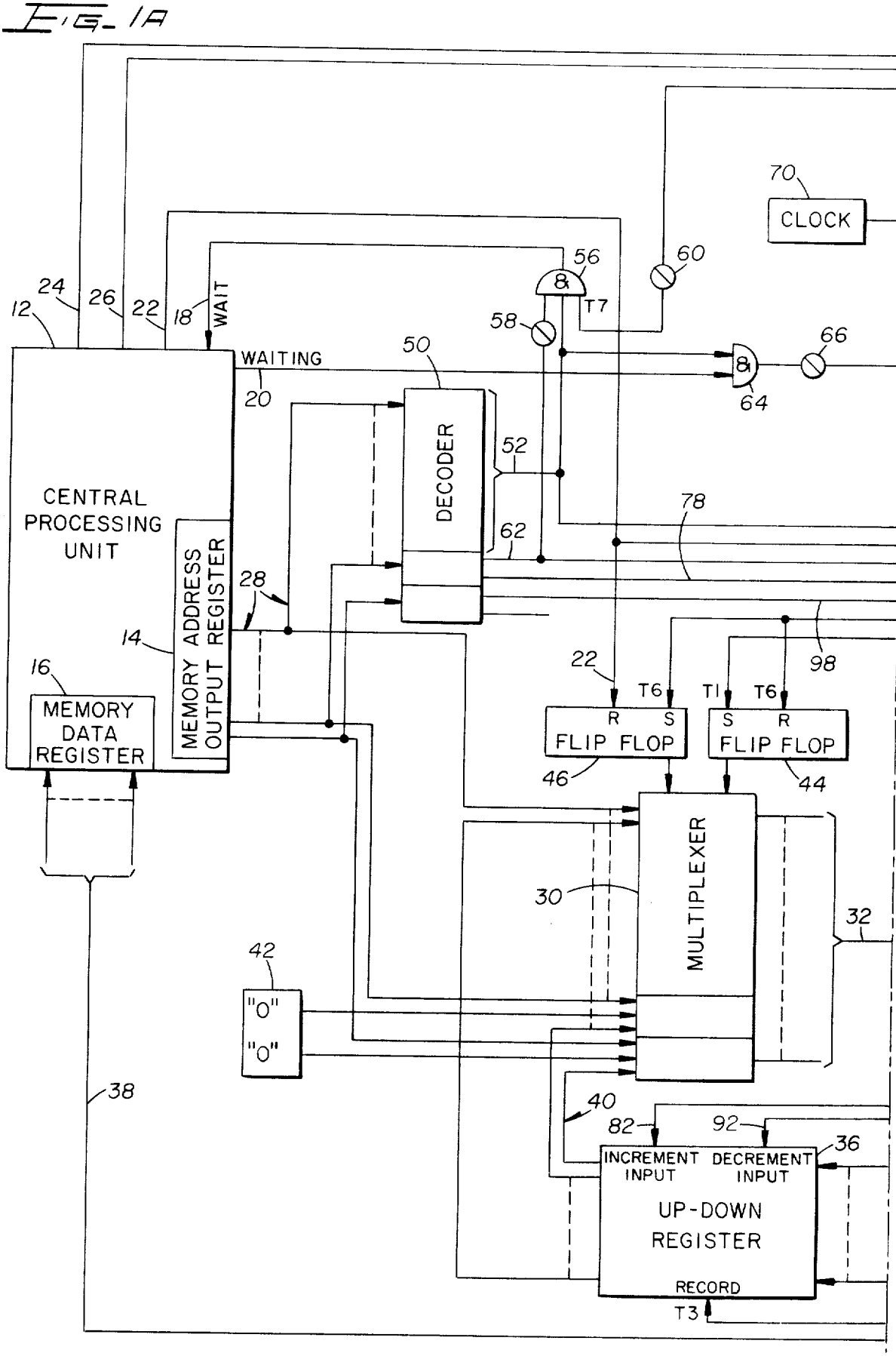

FIG. 2

| | |
|---|---|
| 10000 | 10030 |
| 10001 | 10050 |
| 10002 | 10110 |
| 10003 | 10130 |
| 10004 | 11320 |
| 10005 | 10360 |

| | |
|---|---|
| 20000 | INDEX |
| 20001 | INDIR-INCR |
| 20002 | INDIR-DECR |
| 20003 | INDIRECT |

| | |
|---|---|
| 20004 | INDEX |
| 20005 | INDIR-INCR |
| 20006 | INDIR-DECR |
| 20007 | INDIRECT |

| | |
|---|---|
| 12620 | ׀ ׀ ׀ ׀ ׀ |
| 12621 | ׀ ׀ ׀ ׀ ׀ |
| 12622 | ׀ ׀ ׀ ׀ ׀ |
| 12774 | ׀ ׀ ׀ ׀ ׀ |
| 12775 | JUMP (OR CALL) |
| 12776 | 20000 |
| 12777 | ׀ ׀ ׀ ׀ ׀ |
| 13000 | ׀ ׀ ׀ ׀ ׀ |
| 13001 | ׀ ׀ ׀ ׀ ׀ |
| 13002 | ׀ ׀ ׀ ׀ ׀ |
| 13003 | ׀ ׀ ׀ ׀ ׀ |
| 13004 | ׀ ׀ ׀ ׀ ׀ |
| 13005 | ׀ ׀ ׀ ׀ ׀ |

| | |
|---|---|
| 10030 | ׀ ׀ ׀ ׀ ׀ |
| 10031 | ׀ ׀ ׀ ׀ ׀ |
| 10032 | ׀ ׀ ׀ ׀ ׀ |
| 10033 | ׀ ׀ ׀ ׀ ׀ |
| 10034 | ׀ ׀ ׀ ׀ ׀ |
| 10035 | ׀ ׀ ׀ ׀ ׀ |
| 10036 | ׀ ׀ ׀ ׀ ׀ |
| 10037 | RETURN |

INDIRECT MEMORY ADDRESSING

FIELD OF THE INVENTION

Present invention relates to digital processor memory addressing and more particularly to a system for facilitating indirect addressing by a central processor not normally possessing indirect addressing capability.

BACKGROUND OF THE INVENTION

Some of the smaller mini computers and many of the single -LSI-chip microprocessors are not equipped with sufficiently complex register arrangements to facilitate indirect addressing of the memory of the processor. Indirect addressing allows for greater flexibility of a processor's ability to deal with more complex programs involving multiple subroutines.

SUMMARY OF THE INVENTION

In accordance with the present invention a multiplexer is inserted between the CPU address output register and the address input register of the memory. This multiplexer switches the memory input between the CPU output and the output of a separate register.

When the CPU addresses a specific, dedicated memory location, the output from the dedicated memory location is the address of the memory location containing the desired data.

The address of the desired data is stored in the separate register and directed by the multiplexer into the address input of the memory, whereby the desired data is then read out of the memory by the CPU.

BRIEF DESCRIPTION OF THE DRAWINGS

A more complete understanding of the present invention may be had by referring to the following detailed description when considered in conjunction with the accompanying drawings wherein:

FIG. 1 (FIGS. 1A and 1B) is a schematic block diagram of the use of the present invention with a central processing unit for controlling a memory; and FIG. 2 shows in tabular form typical memory address locations and their contents.

DETAILED DESCRIPTION

Referring now to the accompanying drawings, and more particularly to FIG. 1, a central processing unit (CPU) 12 which may be of any conventional type such, for example, as the Intel 8008 microprocessor. This microprocessor is equipped with an address output register 14 which normally carries the address of the memory location containing the desired data. The CPU also contains a memory data register 66 which contains data to be written into memory or data received from memory. In addition to its other registers and inputs or outputs for controls, the CPU 12 has a wait-command input 18 and a waiting output 20. The wait input 18, when energized, causes the CPU to stop whatever it is doing. The waiting output 20 carries a signal indicating that the CPU is in the waiting mode. The CPU 12 also has an executing instruction output 22 which contains a signal which indicates that the CPU 12 is executing an instruction rather than executing some other operation. The CPU 12 has two additional outputs that are required for its operation with a memory. A memory read command output 24 instructs the memory to execute a read operation and thus interrogate the memory location having the address contained in address output register 14. A memory write command output 26 issues an output signal to instruct the memory to write at the memory location having the address contained in the address output register 14. The data to be written are contained in memory data register 16.

Many microprocessors, such as Intel 8008, and minicomputers operate with short groups of bits called bytes, and an entire field of technology has grown up around the interfacing of short-byte CPUs with longer-byte memories. As one example, a typical CPU such as the Intel 8008 might have a byte length of eight bits, whereas its associated memory might have a byte length of 14 to 16 bits. To simplify the following description of the preferred embodiment of the present invention, it has been assumed that the CPU and all the other circuitry associated therewith have the same byte length. To do otherwise would only obfuscate the present invention. One skilled in the art of computer hardware design will already understand how to interface a short-byte CPU with a long-byte memory.

The output from the address output register 14 is carried on a CPU address bus 28 to one set of inputs of a multiplexer 30. The output from the multiplexer 30 is carried on a memory address bus 32 to an addressable memory 34. The multiplexer 30 is an electronic switch that can connect its outputs to any one of a number of inputs.

An up-down register 36 is connected between a memory data bus 38 and a register bus 40. The register bus 40 is also connected to one set of inputs to the multiplexer 30. The majority of the switches in the multiplexer 30 are single pole double throw transfer switches in electronic form for rapid switching. Therefore, each conductor in the address bus 32 is connected either to an associated conductor in the CPU address bus 28 or a corresponding conductor in the register bus 40. Two of the levels or conductors of the multiplexer 30 are single pole triple throw switches in electronic form which can connect their corresponding conductors in the memory address bus 32 to the corresponding conductors in the CPU address bus 28, the register bus 40, or to a source of 0 state signals 42.

Referring for the moment to FIG. 2, there is shown a tabular representation of certain memory locations within the memory 34. To the left of each memory location depicted in FIG. 2 is shown an arbitrary address number which is the address of the memory location expressed in an octal numbering system. The memory location represented by the octal address number 20,000 is in a dedicated portion of the memory 34 and is called the index location and contains a new or data address address of some other location in the memory. When the address location 20,000 is addressed by the CPU, the CPU can change the address stored in location 20,000. If location 20,003 is addressed by the CPU, this address on the CPU address bus 28 is recognized by a circuit which is described below. When location 20,003 is addressed, the CPU 12 is stopped; and a code-change flip-flop 44 is energized. The code-change flip-flop 44 causes the multiplexer 30 to alter the two least significant bits to the binary 0 state by shifting those two levels of the multiplexer 30 to the signal source 42. Therefore, although octal 20,003 has been addressed, octal 20,000 is placed in the memory address bus 32, thereby interrogating the index memory location which contains the new or data address to another location in the memory. The memory data bus 38 then carries this data address to the up-down register 36 which stores that data address. An address shift flip-flop 46 is then energized and the code-change flip-flop 44 is reset. The address shift flip-flop 46 causes the multiplexer 30 to connect the register bus 40 to the memory address bus 32 in order to apply the data address to the memory 34. The CPU is then restarted and the desired data are obtained from the memory 34.

FIG. 2 illustrates two sets of indirect addressing, dedicated memory locations and indicates that there may be many more. The memory location 20,004 is another index location dedicated to storing another data address which might be, for example, the address of the first instruction of a subroutine.

The memory location 20,001, or alternatively 20,005, if addressed by the CPU, representing an indirect address with an automatic incrementing of the address stored in memory location 20,000, or alternatively 20,004. Similarly, when the CPU addresses memory location 20,002, or 20,006, an indirect memory operation is initiated including an automatic decrement of the address stored in the memory location 20,000, or 20,004. Automatic increment and decrement operations are useful for progressing one after the other in either direction through a succession of memory locations or subroutine addresses. This is most useful in executing a series of either main program instructions or subroutine instructions.

Referring again to FIG. 1, the CPU bus 28 is also connected to a decoder 50. The decoder 50 can be a simple AND-gate system. The most significant bits of the decoder 50 recognize, for example, the memory address 20,000 and issue a signal on a mode conductor 52 each time that one of the dedicated memory locations has been addressed. The least significant two bits of the decoder 50 recognize the four memory addresses 20,000, 20,001; 20,002; and 20,003.

No provision has been illustrated in the decoder 50 for recognizing other dedicated memory locations such as 20,004, 5, 6, etc. However, it is readily apparent to one skilled in the art that only the more significant bits need be recognized by the decoder 50 to energize the mode conductor 52 when any one of the dedicated memory locations is addressed.

Whenever the mode conductor 52 is energized, it provides the third input to a wait AND-gate 56 whose other two inputs are normally provided by a pair of inverters 58 and 60. Therefore, when any one of the dedicated memory locations is addressed, the wait AND-gate 56 issues a wait signal to the wait command input 18 of the CPU 12. However, if the index location address 20,000 (or 20,004, etc.) is addressed, the index output 62 of the decoder 50 causes the index inverter 58 to remove one of the inputs to the wait AND-gate 56; and the CPU is not stopped but merely records the desired data address in the index memory location that was actually addressed by the CPU.

If the indirect address dedicated memory location 20,003 is addressed on the CPU address bus 28, the wait AND-gate 56 is energized and stops the CPU 12. The mode conductor 52 also provides one of the inputs to a reset AND-gate 64. It is undesirable to stop the CPU in the middle of an operation. Therefore, the CPU is typically designed to finish whatever operation it is doing before responding to a wait signal at its wait command input 18. Therefore, since the CPU stops, it sends a waiting signal on the waiting output 20 to the other input of the reset AND-gate 64. The reset AND-gate 64 then causes a reset inverter 66 to remote a reset signal from the reset input of a sequencer 68.

The sequencer 68 is an electronic circuit that provides output pulses sequentially on a series of output wires. The sequencer 68 can take any one of many forms including a ring counter or a binary counter with a series of gates. Timing for the sequencer 68 is provided by a clock 70 which might advantageously be the same clock which times the operations of the CPU 12. The pulses generated by the sequencer 68 are designated by timing numbers T1 through T7 with each T output receiving its sequenced timed pulse in the order indicated by the T numbers.

At the time that the reset is removed from the sequencer 68 the CPU 12 has stopped and the memory location address 20,003 is present on the CPU address bus 28. The first pulse from the sequencer 68 is the T1 pulse which sets the code-change flip-flop 44 to cause the multiplexer 30 to change the least significant bits of the address on the memory address bus 32 so that the memory location 20,000 is addressed rather than the memory location 20,003.

The next pulse from the sequencer 68 is on its output T2 which is connected to one input of a read OR-gate 72. The other input to the read OR-gate 72 is provided by the read command output 24 from the CPU 12. The T2 timing pulse passing through the OR-gate 72 causes the memory 34 to provide on the memory data bus 38 the data address contained in memory location 20,000. This data address is provided to the up-down register 36.

The next pulse from the sequencer 68 is on the T3 output and is connected to the record input of the up-down register 36, triggering the register 36 to store the data address. The data address is now available on the register bus 40. The T4 and T5 outputs of the sequencer are discussed below in connection with the increment and decrement operations.

In the simple indirect memory addressing operation, the next pulse of interest occurs on the T6 output of the sequencer. This pulse is used to reset the code-change flip-flop 44 and to set the address-shift flip-flop 46 to connect the memory address bus 32 through the multiplexer 30 to the register bus 40.

The last pulse from the sequencer 68 on the T7 output supplies an input to the T7 inverter 60 which then removes an input from the wait AND-gate 56 and the CPU 12 again begins operating. The waiting output 20 from the CPU 12 then removes an input from the reset AND-gate 64, and the reset inverter 66 resets the sequencer 68. The CPU 12 then commands the memory on the read command output 24 and read OR-gate 72 to interrogate the data location address stored in the register 36. The data are provided on the memory data bus 38 to the memory data register 16 of the CPU 12. Alternatively, the CPU 12 is in a write mode rather than in a read mode, the write command output 26 passes through a write OR-gate 74 to initiate a write operation of the memory 34 in order to store the data contained in the memory data register 16 of the CPU 12 into the location addressed by the contents of the register 36.

The next cycle of the CPU 12 will be the execution of an instruction. Therefore, the execute-instruction output 22 resets the address-shift flip-flop 46. Consequently, the multiplexer 30 again connects the memory address bus 32 to the CPU address bus 28.

An indirect addressing operation with automatic increment or decrement is very much like the indirect addressing which is described above except for the incrementing and decrement operations and a memory write operation performed at the sequencer times T4, T5, and T6. If the CPU 12 addresses memory location 20,001, it commands an indirect addressing operation with an automatic increment. The decoder 50 energizes the mode conductor 52 and an indirect-increment conductor 78. The operations previously described through the time period T3 are identical with the simple indirect addressing. At the time period T3, the address of the desired data is stored in the up-down register 36.

At the time period T4, the T4 output of the sequencer provides one input to an increment AND-gate 80, the other input be provided by the indirect-increment conductor 78. The output of the increment AND-gate 80 is connected with the increment input 82 of the up-down register 36. This increases the address stored in the register 36 by one.

The incremented data address is then present on the memory data bus 38 and is applied to the memory 34. The address 20,000 is still applied on the memory address bus 32 because of the operation of the code-change flip-flop 44. Therefore, at the next time interval, the T5 output from the sequencer 68 provides one input to the write OR-gate 74; and the memory 34 stores the incremented data address at memory location 20,000.

During the indirect-addressing-only cycle described above in connection with an address to memory location 20,003, the write command generated by the T5 timing pulse caused the memory 34 to write the contents of the register 36 into location 20,000. However, the contents of the register 36 had not been altered. Therefore, that write operation had not changed the contents of location 20,000.

At time period T6, the T6 output of the sequencer 68 provides one input to a re-decrement AND-gate 90. The other input to the re-decrement AND-gate 90 is provided by the indirect-increment conductor 78. Therefore, the redecrement AND-gate 90 applies a signal to the decrement input 92 of the register 36. This re-decrement signal decreases by one the data address stored in the register 36, back to the address recorded in the register 36 during the T3 time frame. At the same time that the contents of the register 36 are redecremented during the T6 time frame, the code change flip-flop 44 is reset and the address shift flip-flop 46 is set and the re-decremented address of the desired data is provided through the multiplexer 30 to the memory address bus 32. The memory location 20,000 then contains the incremented address for use on a subsequent cycle.

When the indirect-decrement address 20,002 is present on the CPU address bus 28, an indirect addressing operation as described above is commanded along with an automatic decrement of the data address. When the memory location 20,002 is addressed, an indirect-decrement output 98 from the decoder 50 is energized and supplies one input to a decrement AND-gate 100 and a re-increment AND-gate 102. Therefore, when the output 98 is energized, the operation of the system through the T3 time frame is identical to that described in conjunction with the simple, indirect addressing operation. At the T4 time frame, the data address stored in the register 36 is decreased or decremented by one. During the T5 time frame, this decremented data address is stored in the index memory location 20,000 and during the T6 time frame the contents of the register 36 is re-incremented by the output from re-increment AND-gate 102, and the indirect addressing operation contiues as described above.

The indirect addressing feature is also useful in performing jump operations and calls to a succession of subroutines. When the CPU 12 encounters a jump instruction or a go-to-subroutine instruction, the CPU is typically built to interrogate the next following memory location to find the address of the first instruction of the jump program or the subroutine and then to execute the instruction contained at that address. Therefore, when the CPU encounters a jump or call-to-subroutine instruction, the program counter (PC) in the CPU 12 is incremented by one and then executes a memory read operation. In the case of a call-to-subroutine instruction, the contents of that memory location are then stored in the program counter and the previous contents of the program counter are transferred to the stack pointer (SP) register of the CPU for the later return to the main program. In the case of a jump instruction, the contents of the next memory location are read into the PC; and the previous contents of the PC are destroyed.

In many processes for control tasks, it is desired that the program advance to a jump or subroutine instruction and each time that the proces advances to that subroutine or jump instruction to advance to a different program or subroutine. This can best be illustrated by referring further to FIG. 2. Memory locations 10,000 through 10,005 have been filled with the address of the first instruction of each of six different subroutines or auxiliary programs which it is desired to execute in sequence. The operation of the main program always starts from memory location 12,620 and progresses step-by-step until it reaches a jump or call instruction at location 12,775. At this point, the programmer wants the CPU 12 to execute one of the subroutines or jump programs illustrated in FIG. 2. Therefore, the index location 20,000 has the address 10,000 stored in it. The memory location 12,776 which follows the jump or call instruction in the main program "points" the CPU 12 to memory location 20,000 to find the first instruction of the subroutine or jump program to which program control must be transferred. Therefore, in the case of a call-to-subroutine instruction, the CPU loads 12,777, the contents of the PC, into the stack pointer. In the case of either a jump or call, the CPU loads address 20,000 from memory location 12,776 into the program counter and proceeds to address to memory location 20,000 to find the first instruction of the routine.

Since the CPU 12 is seeking to execute an instruction, the execute instruction conductor 22 from the CPU 12 is energized. Since the CPU 12 is seeking this instruction at memory location 20,000, the decoder 50 recognizes the address 20,000 on the CPU address bus 28 and energizes the mode conductor 52. The execute instruction conductor 22 and the mode conductor 52 cause a mode AND-gate 104 to energize an inverter 106 which disables a read AND-gate 108. Therefore, the read command on the read output 24 cannot energize the memory 34.

The index output 62, the indirect-increment output 78 and the indirect-decrement output 98 are all connected to a mode OR-gate 110. The output of the mode OR-gate energizes one input of each of a plurality of jump AND-gates 112. The output of the mode AND-gates 104 provides the second input to each of the jump AND-gates 112. When the jump AND-gates 112 receive binary 1- state signals at both their inputs, they execute binary 1 state signals to the memory data bus 38 in order to generate the binary code representing a jump instruction. This is a bogus jump instruction in that it is not part of the stored program. However, the CPU responds to the bogus jump instruction by incrementing its program counter by one and interrogating that memory location to seek the address of the next instruction that is is to execute.

When the program counter increments from 20,000 to 20,001, the indirect addressing circuit responds as described above to stop the CPU and read from memory location 20,000 the address of the desired data. This address is memory location 10,000. Since memory location 20,001 was actually addressed, the address 10,000 that is now stored in the register 36 is incremented by one and written back into memory location 20,000. The contents of register 36 are then redecremented from 10,001 back to 10,000, and the CPU 12 is restarted. The memory location 10,000 is interrogated by the read command from the read command output 24 of the CPU. Since this is a memory fetch operation, the execute instruction output 22 is not energized. The contents of memory location 10,000 is the address, 10,030, of the first instruction of the subroutine and this address 10,030 is received by the CPU 12 and recorded into its program counter register. The CPU then proceeds to interrogate the memory location 10,030 for its first instruction of the subroutine or jump program in accordance with well-known procedures.

The purpose of generating the bogus jump instruction from the jump AND-gates 112 is to allow one additional cycle of the CPU which is necessitated by transfer of program control at the program counter to the address of the dedicated portion of the memory, location 20,000, etc. It is essential that the CPU not attempt to execute a program starting with the address 20,000 in its program counter because address locations following 20,000 do not contain valid program instructions. Therefore, the CPU is immediately tricked into executing the bogus jump instruction which transfers program control not to the dedicated memory location 20,000 but to the memory location address stored at the memory location whose address is stored at memory location 20,000.

What is claimed is:

1. In a system for indirectly addressing dedicated locations in a memory 34, wherein each of said dedicated locations contain a data address signal to another location in said memory, and said system includes a central processing unit (CPU) 12 for interrogating or writing into said memory and for generating indirect address signals comprising most significant bits addressed to said dedicated location and least significant bits not addressed to said dedicated location:

a register means 36 connected to receive and store address signals from said dedicated locations in said memory;

a switchable multiplexer means 30 for switching a normal connection from said CPU to said memory to a connection from said register means to said memory;

a decoder means 50 responsive to the indirect address signal for interrupting operation of said CPU;

a sequencer means 68 actuated by said decoder means ascertaining an indirect address signal for generating a series of successive timing pulses;

a source of signals 42 rendered effective by a first of said timing pulses T-1 to changing the least significant bits in the indirect address signals applied to said multiplexer means to bits addressed to the dedicated location;

means responsive to the signal now applied by the multiplexer means to the dedicated location in the memory and a second timing pulse T-2 for reading and applying the data address signal in said dedicated location to said register means;

means responsive to a third timing pulse T-3 for triggering the register means to store the data address signal;

means responsive to a subsequent timing pulse T-6 for switching the multiplexer to apply the data address stored in the register means to the memory; and means responsive to the next subsequent timing pulse T-7 for reinitiating operation of the CPU to interrogate or write into the memory location at the data address.

2. In a system for indirectly addressing dedicated location in a memory, as defined in claim 1, and the indirect address signal contains least significant bits representative of an increment function:

means responsive to another intermediate timing pulse T-4 and the decoder means ascertaining the presence of least significant bits representative of an increment function for incrementing the data address signal stored in the register means, and means responsive to a subsequent intermediate timing pulse T-5 for writing the incremented address at the dedicated location.

3. In a system for indirectly addressing dedicated locations in a memory, as defined in claim 1 and the indirect address signal contains least significant bits representative of a decrement function:

means responsive to another intermediate, timing pulse T-4 and the decoder means ascertaining the presence of least significant bits representative of a decrement function for decrementing the data address signal stored in the register means, and means responsive to a subsequent intermediate, timing pulse T-5 for writing the decremented address at the dedicated location.

* * * * *